United States Patent
Grosse-Bley et al.

(10) Patent No.: US 8,528,386 B2
(45) Date of Patent: Sep. 10, 2013

(54) SNIFFING LEAK DETECTOR ACCORDING TO THE REFERENCE MEASUREMENT PRINCIPLE

(75) Inventors: Werner Grosse-Bley, Bonn (DE); Ludolf Gerdau, Elsdorf (DE); Gerhard Küster, Köln (DE); Ulrich Döbler, Wermelskirchen (DE)

(73) Assignee: Inficon GmbH, Cologne (DE)

( * ) Notice: Subject to any disclaimer, the term of this patent is extended or adjusted under 35 U.S.C. 154(b) by 394 days.

(21) Appl. No.: 12/865,643

(22) PCT Filed: Feb. 6, 2009

(86) PCT No.: PCT/EP2009/051394
§ 371 (c)(1),
(2), (4) Date: Jul. 30, 2010

(87) PCT Pub. No.: WO2009/098302
PCT Pub. Date: Aug. 13, 2009

(65) Prior Publication Data
US 2010/0326169 A1    Dec. 30, 2010

(30) Foreign Application Priority Data
Feb. 8, 2008    (DE) .................. 10 2008 008 262

(51) Int. Cl.
*G01M 3/04*    (2006.01)
(52) U.S. Cl.
USPC ........................................... 73/40.7

(58) Field of Classification Search
USPC ........................................... 73/40.7
See application file for complete search history.

(56) References Cited

U.S. PATENT DOCUMENTS

| 5,469,732 A | 11/1995 | Voss |
| 6,635,875 B1 | 10/2003 | Bley |
| 7,030,381 B2 | 4/2006 | Kilian |
| 7,159,445 B2 | 1/2007 | Boehm |

FOREIGN PATENT DOCUMENTS

| WO | 0055603 A1 | 9/2000 |
| WO | WO02/48686 | 6/2002 |

OTHER PUBLICATIONS

International Search Report for the corresponding International Patent Application No. PCT/EP09/51394 dated May 12, 2009.
Boehm, T., "A new type of refrigerant leadk detector for leak tests in the refrigerating and air conditioning industry," http://www.ndt.net/article/v08n01/boehm/boehm.htm XP-002524826, Jan. 2003, 6pp.
English translation of Response to Written Opinion from corresponding International Patent Application PCT/EP2009/051394 dated Apr. 12, 2010.

*Primary Examiner* — Hezron E Williams
*Assistant Examiner* — Rodney T Frank
(74) *Attorney, Agent, or Firm* — Ohlandt, Greeley, Ruggiero & Perle, LLP

(57) ABSTRACT

A sniffing leak detector comprises a handle with a sniffing tip. Located at the sniffing tip is a measurement gas suction opening and a reference gas suction opening. The reference gas suction opening is intended for suctioning ambient gas. The reference gas suction opening is aligned substantially the same as the measurement gas suction opening such that both suction openings are sensitive in the same direction.

12 Claims, 2 Drawing Sheets

SNIFFING LEAK DETECTOR ACCORDING TO THE REFERENCE MEASUREMENT PRINCIPLE

BACKGROUND

1. Field

The disclosure relates to a sniffing leak detector according to the reference measurement principle, comprising a basic unit including a vacuum pump device, further comprising a handpiece provided with a sniffing tip and being connected to the basic unit via a hose, a measurement-gas suction opening for sucking in measurement gas, a reference-gas suction opening for sucking in reference gas, and a gas analyzer for determining the concentrations of the measurement gas and the reference gas.

2. Discussion of the Background Art

WO 00/55603 describes a sniffing leak detector according to the reference measurement principle comprising, apart from the measurement-gas suction opening, also a reference-gas suction opening. Sniffing leak detection is frequently performed on test objects which contain cooling agents or hydrocarbons. In such a process, the media present in the test object will serve as a test gas. In case that a leak exists, small quantities of the respective test gas will reach the sniffing leak detector. The sniffing leak detector includes a gas analyzer adapted to detect the test gas. A problem in sniffing leak detection resides in that there will be suctioned not only the test gas issuing from the leak but also gas from the ambience of the sniffing tip. If the latter gases from the ambience should happen to include minor concentrations of the test gas, which may originate from leaks detected at an earlier time or from the filling station of a production line, also these test gas concentrations will be registered by the gas detector. In order to differentiate between measurement gas and ambient gas, it has been proposed to provide a measuring cuvette and a reference cuvette in the gas analyzer, thus obtaining a measurement gas signal and a reference signal. Both signals are processed in the lock-in amplifier to the effect that the respective useful signal will first be subjected to a modulation and then to a phase-sensitive rectification. Obtained in this manner is a useful signal which represents the difference of the measurement signal over the reference signal.

WO 02/48686 A2 describes a sniffing leak detector which again comprises a measurement-gas suction opening and a reference-gas suction opening. With the aid of a switching valve, both suction openings will be alternately connected to the inlet of a cuvette arranged in connection to a vacuum pump device.

In refrigerators and air-conditioning systems, increased use is made of $CO_2$ as a cooling agent. In tightness testing performed on such devices, the ambient air has to be checked for $CO_2$ as a test gas. $CO_2$ is also contained in a high concentration in the air exhaled by the operating person. In the usual sniffing leak detectors operating according to the reference measurement principle, the measurement-gas suction opening is arranged at the end of the sniffing tip whereas the reference-gas suction opening is arranged laterally and at a recessed position. Therefore, it may occur that a stream of the operating person's exhaled air will reach the reference-gas suction opening. In such a case, the device will detect a "negative leak" because the concentration of $CO_2$ in the ambient air around the measurement site is higher than at the measurement site itself.

SUMMARY

It is an object of the disclosure to provide a sniffing leak detector according to the reference measurement principle, wherein reliable results are obtained irrespective of possible streams in the ambient air and wherein the leak detection and leak assessment are improved.

The sniffing leak detector of the present disclosure is characterized in that the measurement-gas suction opening and the reference-gas suction opening on the sniffing tip are arranged substantially parallel to each other.

By the substantially parallel arrangement of the two suction openings, it is achieved that they will suction the air generally from the same direction. Consequently, the measurement result is not significantly adulterated by an accidental or temporary transverse flow of the air. The operating person will place the measurement-gas suction opening directly at the site to be tested for leaks while the reference-gas suction opening is located at a lateral distance therefrom while, however, being oriented in the same main direction.

The fact that the two suction openings are arranged substantially parallel to each other is to say that they are allowed to have a slight angular deviation. This deviation is maximally 15 angular degrees and with preference maximally 10 angular degrees. The advantage of the disclosure becomes apparent in an atmosphere undergoing dynamic movements with crossflows occurring in it. Such crossflows may occur as a result of the operating person's inhalation and exhalation. By the above arrangement of the suction openings on the sniffing tip, it is achieved that the measuring sensitivity is given directional selectivity since, herein, both suction openings will be effective in the same direction.

The suction openings can each be formed as a single opening or multiple opening, e.g. as individual bores or a pore structure of a porous body. It is also possible to use a membrane which is permeable to the measurement gas.

Preferably, the reference-gas suction opening is arranged at a recessed position relative to the measurement-gas suction opening. In this manner, it is accomplished that the measurement-gas suction opening can be placed directly on the measurement site while the reference-gas suction opening is kept at a larger distance from the measurement site and thus can suction a larger quantity of ambient air.

The sniffing tip should be configured to achieve a highly symmetrical gas transport to the detection system. For this purpose, the lengths and the volumes of the two gas channels leading from the sniffing tip to the gas analyzer should be approximately equal. Preferably, the gas inlets on the sniffing tip are coaxial to each other or are rotationally symmetric. The sniffing tip must have a suitable shape to make it possible for the measurement-gas suction opening, in spite of its closeness to the reference-gas suction opening, to effect a certain separation of the gas stream.

In the industrial use of sniffing leak detectors, the demands on robustness of the devices are very high. The reasons for this are, on the one hand, the rough working environment and, on the other hand, the intense continuous operation of the device. The sniffing tip can be realized according to any one of various design options:

1. central tube, slightly projecting relative to an open annular gap around the tube,
2. projecting central tube, surrounded by an array of microchannels entering a reference-gas conduit, said channels being
   a. discretely bored or etched,
   b. formed as a porous filter body,
3. projecting central tube, surrounded by an annular membrane entering a reference gas conduit,
4. semispherical or semi-ellipsoid body, comprising a measurement-gas opening formed centrally at the highest point and an annular gap somewhat "deeper". Herein, the annular gap can again be formed by an opening, individual holes, or membranes.

The sniffing leak detector of the disclosure, designed according to the reference measurement principle, operates with gas modulation. The measurement gas and the reference gas are alternately supplied to the measurement process in the detection system by causing the suctioning to alternate between the measurement-gas suction opening and the reference-gas suction opening. Generated thereby is an approximately sinusoidal signal whose amplitude represents the difference between the measurement and reference gas concentrations. Switchover between the measurement gas and the reference gas is performed by a switching valve which is controlled by a lock-in unit. The difference amplitude will be integrated in phase-synchronism with the valve-switching frequency. In this manner, interference signals having a false frequency and/or phase position will be filtered out. The detection system must have short enough time constant to avoid a loss of signal intensity due to an insufficient modulation amplitude. At least, the time constant of the detection system should be equal to the inverse value of the modulation frequency. On the other hand, the modulation frequency has to be high enough to allow for dynamic localizing of leaks. This means that the operating person can move the sniffing tip with an adequately high speed without missing a leak. A typical modulation frequency is in the order of magnitude of 3 Hz. Depending on the respective use, the material of the sniffing tip can be extremely hard, or abrasion-resistant and elastic.

The switching valve for the gas streams can be arranged in or on the sniffing tip or also at the end of the two gas-transport conduits. The switching valve should have a dead volume as small as possible, and its load-variation endurance should be sufficient for allowing the valve to endure a continuous operation at the respective modulation frequency through a longer period of time.

Embodiments of the disclosure will be explained in greater detail hereunder with reference to the drawings.

DETAILED DESCRIPTION OF THE PREFERRED EMBODIMENT

Figure 1:
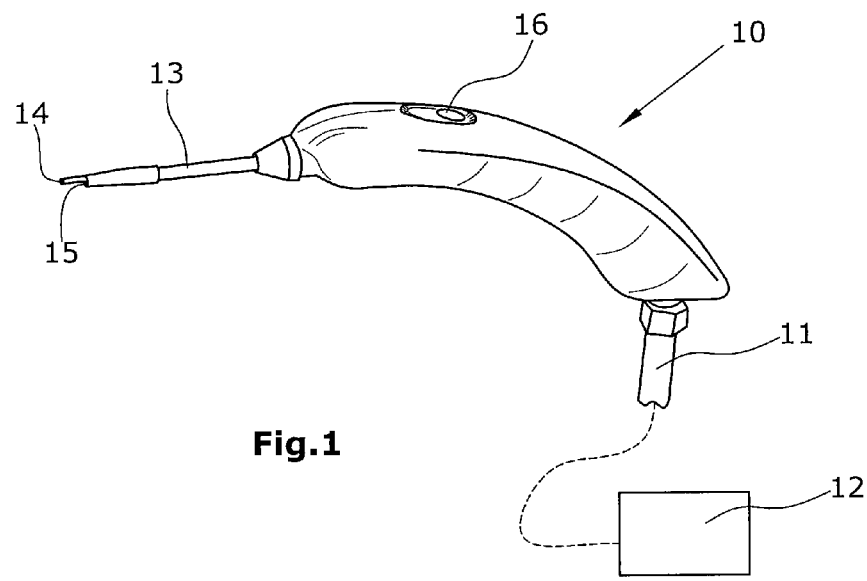
FIG. 1 is a view of a first embodiment of the sniffing leak detector wherein the gas analyzer is integrated into the handle.

The sniffing leak detector depicted in FIG. 1 comprises a handle 10 formed as a hand-grip and connected to a basic unit 12 via a hose 11. A sniffing tip 13 extends from the front end of said elongate handle 10. The sniffing tip comprises an elongate tube with two separate channels arranged internally thereof. One of said channels terminates at the forward measurement-gas suction opening 14. The plane of this suction opening is oriented at a right angle relative to the longitudinal axis of said sniffing tip 13. The other channel terminates at the reference-gas suction opening 15 which is arranged at a slightly recessed position and whose surface extends parallel to that of said suction opening 14.

Basic unit 12 contains, inter alia, a vacuum pump device. Via said hose 11, the vacuum is transmitted to handle 10. Handle 10 includes a gas analyzer (not shown). Said gas analyzer comprises an infrared gas analyzer which is operative for selective detection of the gas $CO_2$. Such a gas analyzer is of a simple and compact constructional design, allowing it to be accommodated within a hand-grip. Electric power supply is performed by basic unit 12 via hose 11. Handle 10 further includes operating keys, e.g., a key 16 by which the operating person will initiate the measurement process. Since the reference-gas suction opening 15 is oriented substantially in the same direction as the measurement-gas suction opening, both suction openings will suction gas from the same direction.

Figure 2:
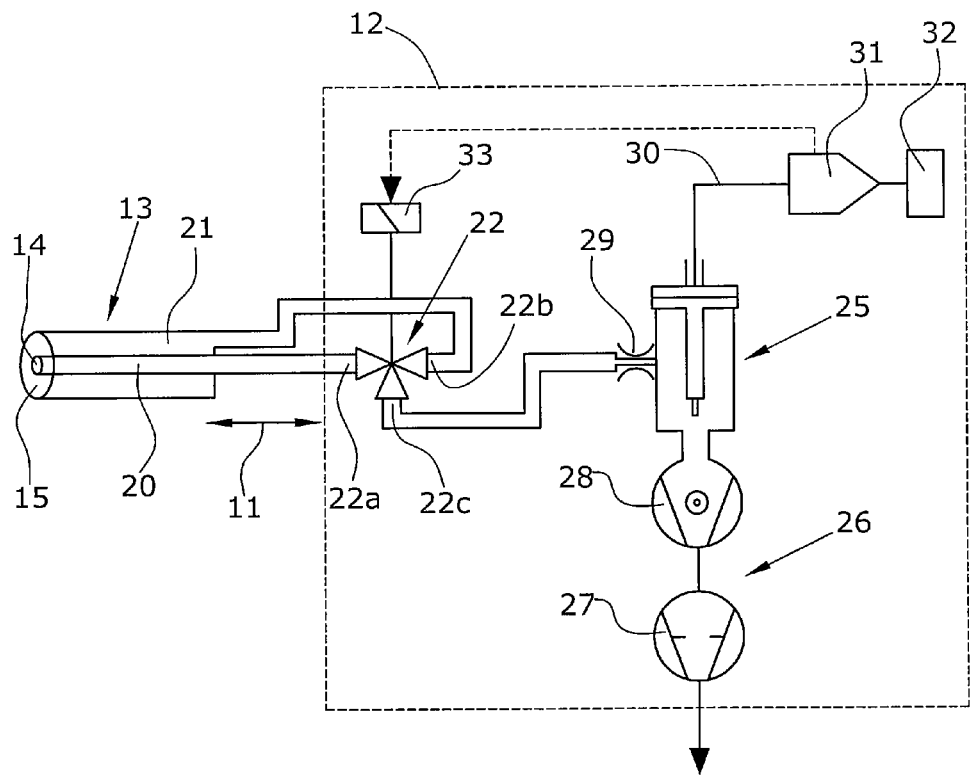
FIG. 2 is a view of an embodiment wherein the gas analyzer is a mass spectrometer.

FIG. 2 depicts another embodiment of the sniffing leak detector wherein a mass spectrometer is used as a detection system. A mass spectrometer, although involving increased expenditure on the equipment level, will offer the advantages of highest selectivity, highest sensitivity and large flexibility with respect to the gases which have to be analyzed.

According to FIG. 2, the sniffing tip 13 includes a measurement-gas conduit 20 connected to the measurement-gas suction opening 14, and a reference-gas conduit 21 arranged coaxially thereto and connected to the reference-gas suction opening 15. Both conduits extend through hose 11 to basic unit 12. The basic unit includes a switching valve 22 which in the present example is formed as a 3/2-way valve. This means that the valve has three connections and two alternative switching paths. An inlet 22a is connected to conduit 20, and a further inlet 22b is connected to conduit 21. The outlet 22c of the switching valve is connected to a gas analyzer 25 which herein is realized as a mass spectrometer. Said mass spectrometer requires a high vacuum. Provided for this purpose is a vacuum pump device 26 comprising a pre-vacuum pump 27 and a high-vacuum pump 28 in the form of a turbomolecular pump. At the inlet of said gas analyzer 25, a throttle 29 is arranged.

The measurement signal of gas analyzer 25 is supplied via a line 30 to a lock-in unit 31. The lock-in unit delivers an output signal to a display unit 32 or to another indicating device. Lock-in unit 31 further controls the solenoid 33 of switching valve 22. The lock-in unit will receive a clock signal from a clock generator and will switch the switching valve 22 in a corresponding rhythm for alternately connecting inlet 22a and inlet 22b to outlet 22c.

Figure 3:
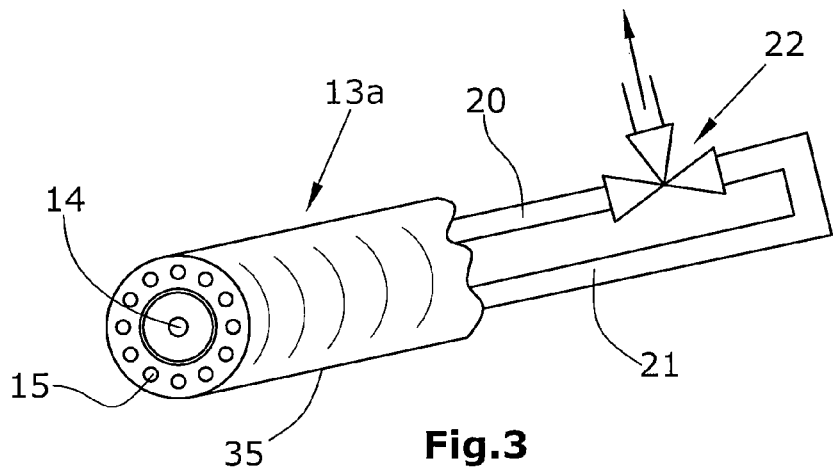
FIG. 3 is a schematic representation of a sniffing tip comprising channel openings arranged in a distributed pattern around the measurement-gas suction opening.
Figure 4:
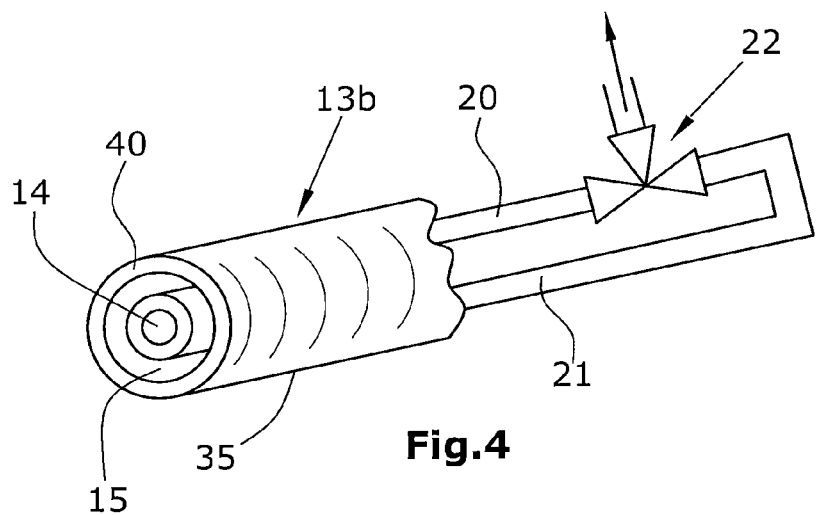
FIG. 4 is a view of an embodiment of the sniffing tip comprising coaxial suction openings.
Figure 5:
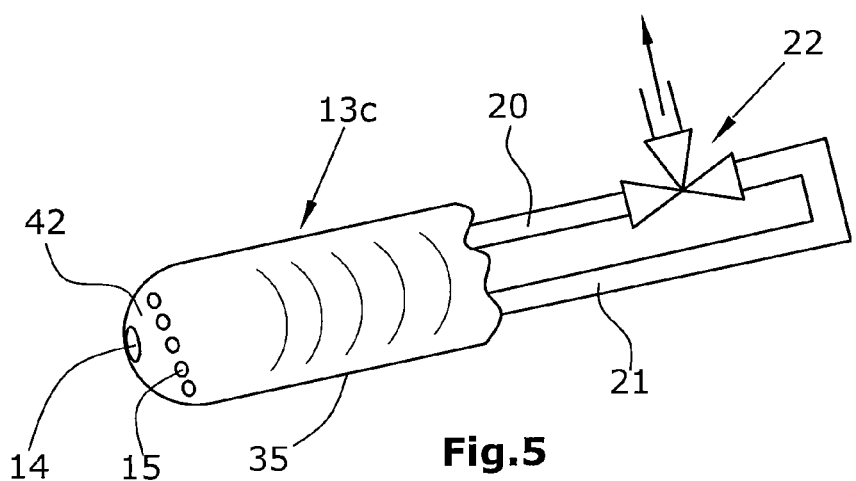
FIG. 5 is a view of a further embodiment which is particularly suited for robust uses.

In FIGS. 3, 4 and 5, various embodiments of the sniffing tip are shown. FIG. 3 shows an embodiment of the sniffing tip 13a comprising a tube 35 with the measurement-gas suction opening 14 formed at its forward end. In the tube wall, microchannels are arranged which in their totality form the reference-gas suction opening 15. Said microchannels surround the reference-gas suction opening 14 at equal angular distances. They are connected to conduit 21 while the measurement-gas suction opening 14 is connected to conduit 20. Both conduits lead to the switching valve 22 which is configured and controlled in the same manner as that shown in FIG. 2.

FIG. 4 shows a sniffing tip 13b comprising an outer tube 35 and an inner tube 40 arranged coaxially in the outer tube. Said inner tube 40 forms the measurement-gas suction opening 14, and the annular space between the two tubes forms the reference-gas suction opening 15. Preferably, inner tube 40 projects in the forward direction relative to outer tube 35.

In the embodiment according to FIG. 5, the sniffing tip 13c including said two conduits 20 and 21 comprises an abrasion-resistant elastic material. The front end of the tip presents a rounded dome 42 with the measurement-gas suction opening 14 formed in its apex. Further openings arranged in said dome are provided to form, in their totality, the reference-gas suction opening 15.

The invention claimed is:

1. A sniffing leak detector according to the reference measurement principle, comprising a basic unit including a vacuum pump device, further comprising a handpiece with a sniffing tip, the handpiece being connected to the basic unit via a hose, a measurement-gas suction opening for sucking in measurement gas, a reference-gas suction opening for sucking in reference gas, and a gas analyzer for determining the concentrations of the measurement gas and the reference gas, wherein the measurement-gas suction opening and the reference-gas suction opening on the sniffing tip are arranged substantially parallel to each other with an angular offset of at most 15 degrees, the reference-gas suction opening being arranged at a recessed position relative to the measurement-gas suction opening, being arranged around the measurement-gas suction opening, and comprising a plurality of channel openings forming a ring surrounding the measurement-gas suction opening.

2. The sniffing leak detector according to claim 1, wherein the sniffing tip is made of an abrasion-resistant elastic material.

3. The sniffing leak detector according to claim 1, wherein the sniffing tip comprises a rounded dome with the suction openings arranged therein.

4. The sniffing leak detector according to claim 1, further comprising a switching valve provided for alternate connection of the measurement-gas suction opening and the reference-gas suction opening to the gas analyzer.

5. The sniffing leak detector according to claim 4, wherein the switching valve is controlled by a lock-in unit processing the signals of the gas analyzer in phase-synchronism with the switching of the switching valve.

6. The sniffing leak detector according to claim 1, wherein the angular offset is at most 10 degrees.

7. A sniffing leak detector according to the reference measurement principle, comprising:
   a basic unit including a vacuum pump device;
   a handpiece connected to the basic unit via a hose; and
   a sniffing tip having with two separate channels arranged along a longitudinal axis, one of the two separate channels terminating at a measurement-gas suction opening and the other of the two separate channels terminating at a plurality of reference-gas suction openings forming a ring surrounding the measurement-gas suction opening,
   the measurement-gas suction opening defining a first plane and the plurality of reference-gas suction openings defining a plurality of second planes,
   the plurality of second planes being arranged at recessed positions along the longitudinal axis with respect to the first plane, and
   the first and second planes having an angular offset with respect to one another of at most 15 degrees.

8. The sniffing leak detector according to claim 7, wherein the first plane is at a right angle relative to the longitudinal axis.

9. The sniffing leak detector according to claim 7, wherein the angular offset is at most 10 degrees.

10. The sniffing leak detector according to claim 7, wherein the sniffing tip is made of an abrasion-resistant elastic material.

11. The sniffing leak detector according to claim 7, further comprising a switching valve provided for alternate connection of the measurement-gas suction opening and the plurality of reference-gas suction openings to a gas analyzer.

12. The sniffing leak detector according to claim 11, wherein the switching valve is controlled by a lock-in unit processing signals of the gas analyzer in phase-synchronism with switching of the switching valve.

* * * * *